United States Patent [19]

Stephenson

[11] 4,326,592
[45] Apr. 27, 1982

[54] TOOL FOR EARTHWORKING MACHINE

[75] Inventor: Earle W. Stephenson, Latrobe, Pa.

[73] Assignee: Kennametal Inc., Latrobe, Pa.

[21] Appl. No.: 46,944

[22] Filed: Jun. 8, 1979

Related U.S. Application Data

[63] Continuation-in-part of Ser. No. 13,720, Feb. 21, 1979, abandoned, which is a continuation-in-part of Ser. No. 785,453, Apr. 7, 1977, abandoned.

[51] Int. Cl.$^3$ ............................................. A01B 33/10
[52] U.S. Cl. .................................... 172/123; 172/548; 172/556; 172/747
[58] Field of Search ............................... 172/118–123, 172/540, 548, 556, 747; 299/89, 91, 93; 125/22, 15; 37/94; 76/112; 83/839; 29/105; 144/240; 175/410, 411

[56] References Cited

U.S. PATENT DOCUMENTS

| | | | |
|---|---|---|---|
| 1,415,663 | 5/1922 | Lilleberg | 172/532 |
| 2,663,241 | 12/1953 | Howard | 172/556 |
| 2,802,408 | 8/1957 | Seaman | 172/556 X |
| 3,702,638 | 11/1972 | Takata | 172/540 |
| 3,737,199 | 6/1973 | Stephenson | 172/123 |
| 3,783,952 | 1/1974 | Gemert | 172/123 |

FOREIGN PATENT DOCUMENTS

| | | | |
|---|---|---|---|
| 252712 | 1/1960 | Australia | 172/123 |
| 531125 | 10/1955 | Italy | 172/556 |

Primary Examiner—Richard J. Johnson
Attorney, Agent, or Firm—Lawrence R. Burns

[57] ABSTRACT

A tool for an earthworking machine in which the machine has a rotor with one or more support plates mounted in an axially distributed relation with each plate carrying one or more earthworking tools in circumferentially distributed relation. Each tool extends radially outwardly from the respective plate and at the outer end has an earthworking portion extending transversely to the plane in which the tool rotates. The forward working portion comprises a foremost impact region and a cutting edge that slopes rearwardly from the direction of rotation as the edges extend away from the impact region.

17 Claims, 15 Drawing Figures

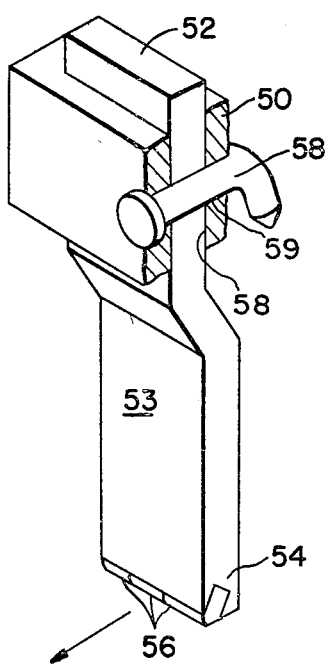
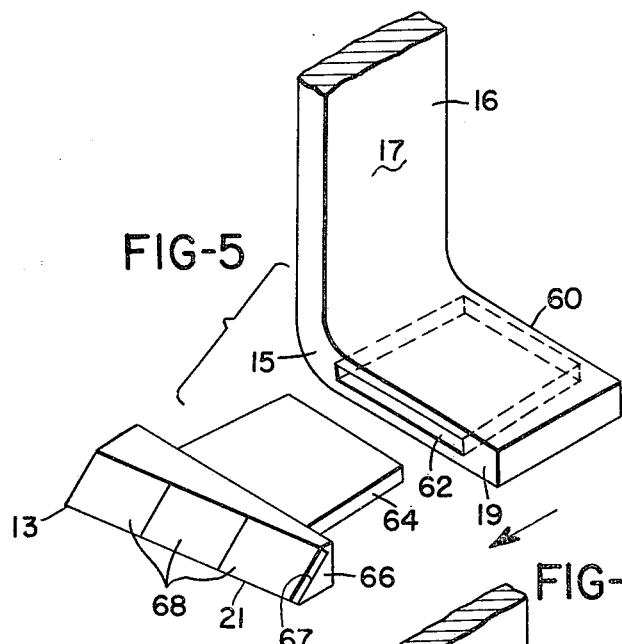
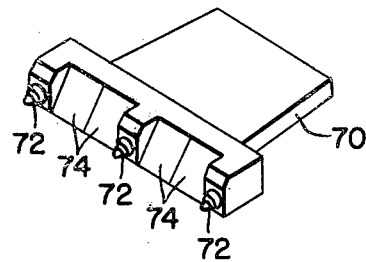
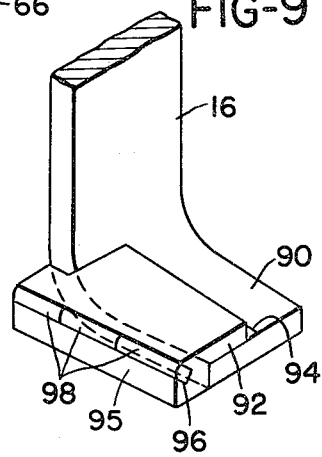
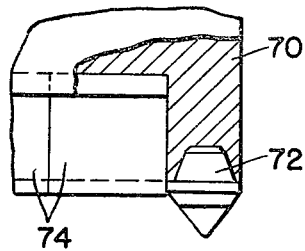
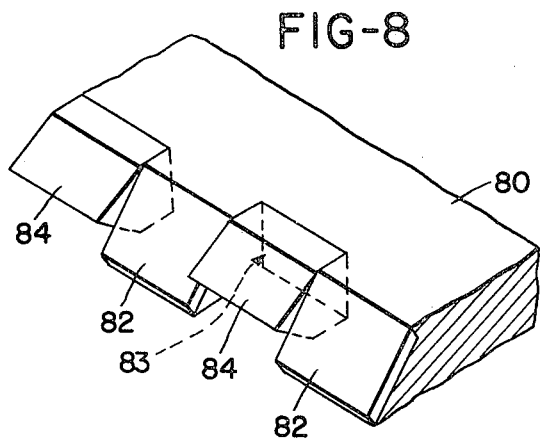

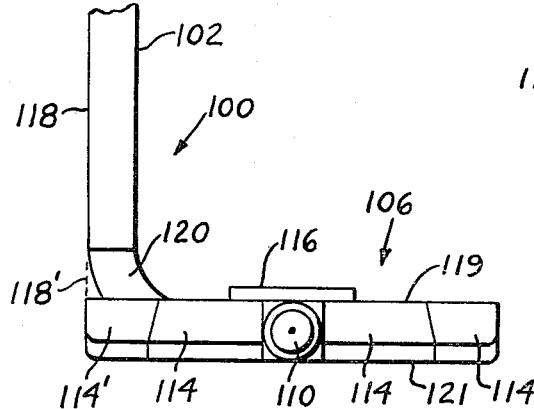
FIG-11
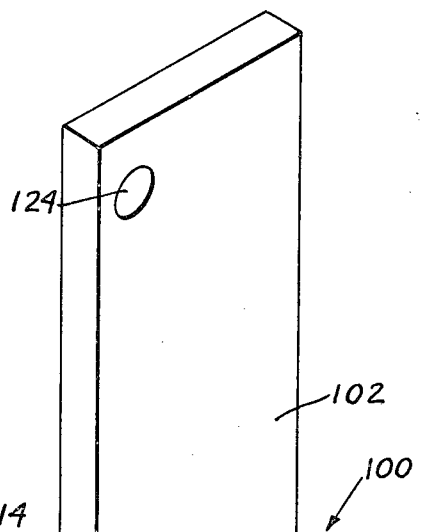
FIG-10
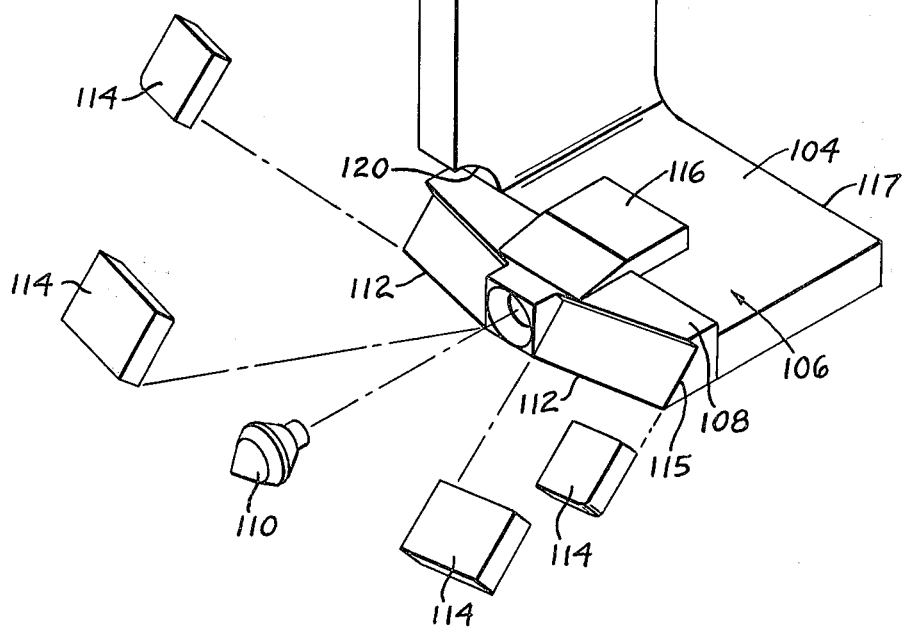

TOOL FOR EARTHWORKING MACHINE

RELATED APPLICATIONS

The present application is a Continuation-in-Part of copending application Ser. No. 013,720, filed Feb. 21, 1979, which was a Continuation-in-Part of application Ser. No. 785,453, filed Apr. 7, 1977, each now abandoned.

The present invention relates to earthworking equipment, and is particularly concerned with a tool, or tooth, for use with soil stabilizers, trenchers or like machinery.

According to the present invention, the tool, or tooth, is illustrated and described particularly in connection with a soil stabilizer, but it will be understood that the use of the tool is not limited to this particular application.

A soil stabilizer is a machine which is employed in certain regions where the soil is of such a nature that it can be broken into a fine condition and then supplied with additives, such as lime, salt, fly ash, cement, or the like, so as to provide a hard foundation in the soil.

The mechanism employed in breaking up the soil is known as a soil stabilizer and comprises at least one shaft extending generally parallel to the earth surface to be worked and has means for supporting tools or support arms for tools which extend generally radially in respect of the shaft.

The shaft is driven in rotation while the machine is advanced along the region to be worked and the tools carried by the shaft cut up the soil and reduce the soil to a stationary fine condition for being mixed with appropriate additives as aforementioned to provide for the desired soil condition.

Due to the abrasive nature of soil and, in particular, soil having a high silica content, the teeth or tools on such a piece of equipment wear out quite rapidly and the cost of replacing the teeth periodically, including the down time of the mechanism, is a substantial item to take into account in respect of the preparation of roadbeds.

The machines referred to encounter rocks, high abrasive conditions and, sometimes, the soil is packed down relatively hard, requiring considerable effort to open the soil.

A particular object of the present invention is to provide a tool arrangement for an earthworking machine in which the life of the tool arrangement is substantially increased, thereby preventing excessive down time maintenance.

A further object is the provision of a tool arrangement for an earthworking machine or the like in which renewal of the working region of the tooth can be effected at reduced cost.

A still further object is the provision of an earthworking tool arrangement in which hard wear resistant material is so located at the outer end of a support arm for the tool that the arm is protected from abrasion.

BRIEF SUMMARY OF THE INVENTION

According to the present invention, a rotary shaft in an earthworking machine supports plates or the like in respective axially spaced planes which are substantially perpendicular to the axis of the shaft. These plates, in turn, support teeth supporting arms in a circumferentially distributed relation and, preferably, also in axially distributed relation.

Each arm or tool at the outer end is provided with a forwardly facing edge portion having hard wear resistant material inserted therein. Such material, in view of the extremely highly abrasive conditions encountered in earthworking operations, can advantageously comprise a cemented hard carbide material such as cemented tungsten carbide or a like wear resistant material such as might be formed by forming a compound of a metal with boride or the like.

In general, each arm has a larger portion disposed in a plane perpendicular to the axis of the support shaft and a laterally offset end part. The offset end part is provided with hard wear resistant material mounted thereon or inserted therein, or the end part may be configured to receive and support a tool element having wear resistant material applied to or imbedded in the forwardly facing edge thereof.

In one modification, the support arm is detachably mounted in a block carried on one of the aforementioned plates and is disposed in a plane extending substantially axially of the shaft so that the arm is presented with the broad side facing in the direction of rotation and with the outermost edge of the arm provided with hard wear resistant material applied thereto or inserted therein.

In operation, the hard edge of the tool elements mounted on the outer end of the arm effects an initial penetration into the formation being worked and also fractures hard portions of the formation, the tool element on the arm further breaks up the soil and admixes the soil to form a uniform material for treatment.

The tool elements, when such elements are provided, may be detachably mounted on the outer ends of the support arms, as by interfitting tongue and socket means, or the tool elements may be welded to the outer ends of the arms.

The arms can advantageously be formed of bent strips of sheet metal, in which case the thickness of the arm is substantially constant from end to end.

However, it is also possible to forge the arms, in which case the thickness could vary from the inner end to the outer end, thereby permitting the outer end to be made to a thickness which would permit drilling or slotting or any other type of machining thereof that might be necessary to accomodate wear resistant inserts or to permit hard wear resistant plates to be mounted on the arm or to be inserted into recesses provided therefor in the arm.

In the preferred embodiment of the present invention, an arm or shank is adapted to be supported on a rotary member with one end of the arm extending generally radially outwardly from the power-driven member. The arm terminates in a working portion or end that is located substantially on one side of the shank or arm. The working end has a forwardly facing side and a trailing side with abrasion protection means mounted on the forwardly facing side.

The forwardly facing side comprises a foremost impact region and an adjoining cutting edge which inclines rearwardly from the direction of rotation of said impact region as the edge extends outwardly from the impact region.

Preferably, the abrasion protection means comprises surfaces of hard wear resistant material, such as cemented hard metal carbides, that are inclined to the cutting edge from the radially inner side of said tool.

When the earthworking tool is viewed from a front view, the arm or shank can be seen to have a certain thickness and the abrasion protection means extends substantially across and in front of the thickness of the arm or shank. Immediately above the abrasion protection means that is across and in front of the arm, the shank is preferably notched or has a recess for a short distance above the location of the protection means.

Preferably, the method for making the earthworking tool comprises the steps of forming an elongate rectangular bar-like member and blanking the member so as to form a hole in one end and a recess along the other end, the recess making the strip of steel narrower along one end. The resistant end is bent to form an L-shaped configuration when viewed in front view, the L-shaped member then being heat treated and stress relieved.

A second metal member is then chosen, preferably being harder than the material of which the bar-like member is made. The second metal member then has the abrasion protection means mounted thereon so that the second member and the abrasion protection means form the forward portion of the working end. The second member is then welded to the L-shaped member to complete the finished article.

The exact nature of the present invention will become more clearly apparent upon reference to the following detailed specification taken in connection with the accompanying drawings in which:

FIG. 4 shows another modified arm according to the present invention.

FIG. 5 shows still another modified arm in which a tool element is provided at the outer end of the arm which is separable therefrom.

FIG. 6 shows a modification of an earthworking element that can be mounted on the arm of FIG. 5.

FIG. 7 is a fragmentary view, partly in section, showing one end portion of the tool element of FIG. 6.

FIG. 8 is a view similar to FIG. 7 but shows a modified form of the tool element or the outer end of the arm.

FIG. 9 is a view similar to FIG. 5 but showing still another modification of the tool.

FIG. 10 is a perspective view of the preferred embodiment of the present invention.

FIG. 11 is a front view of the embodiment shown in FIG. 10.

DETAILED DESCRIPTION OF THE INVENTION

Figure 1:
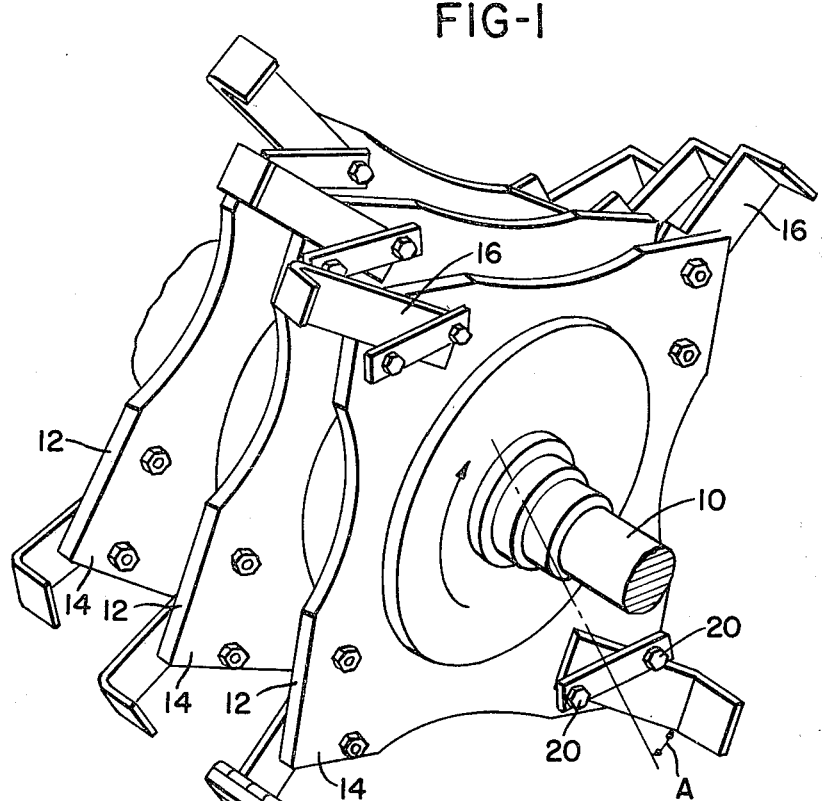
FIG. 1 is a perspective view showing a portion of a rotor of the type associated with an earthworking machine (not shown) which operates as a soil stabilizer.

Referring to the drawings somewhat more in detail, in FIG. 1, the shaft 10 is adapted for being rotatably mounted in a soil stabilizing machine of a type adapted for working soil up to about half the diameter of the rotor of which shaft 10 forms the central part. A machine of the general nature referred to is illustrated in the Stephenson U.S. Pat. No. 3,737,199, assigned to the same assignee as the instant application.

Rotor 10 carried a plurality of plates 12 in axially distributed relation and angularly oriented as illustrated in the drawings so that the corner portions 14 of the plates are arranged in a substantially helical path.

Plates 12 are adapted for supporting generally radially extending arms 16 which may be connected to the respective plate 12 as by a clamp bar 18 and clamp bolts 20. Advantageously, the arms incline rearwardly from a radial direction as indicated by angle A on FIG. 1. However, the particular angle of the arms in respect of a radial direction is not significant except that this angle is chosen to present the hardened forward edge of the tool elements in the most advantageous position for efficient soil penetration.

Each plate 21 in FIG. 1 carries four arms 16 as shown in FIG. 1 and each arm has a forward working side as indicated by reference numeral 22 in respect of the arm 16 at the bottom of FIG. 1. The working portion 22 is integral with or is welded on or is detachably connected to the other end of the respective arm, as will be seen in the other figures making up the drawings in the present application.

However, each working portion of the outer end of an arm is provided with hard wear resistant material therein, advantageously, cemented tungsten carbide, which will penetrate and cut the earth engaged by the rotor as the supporting machine for the rotor advances along its working path.

Various ways of providing the hardened forward working edge on each support arm are illustrated in the other views in this application.

Figure 2:
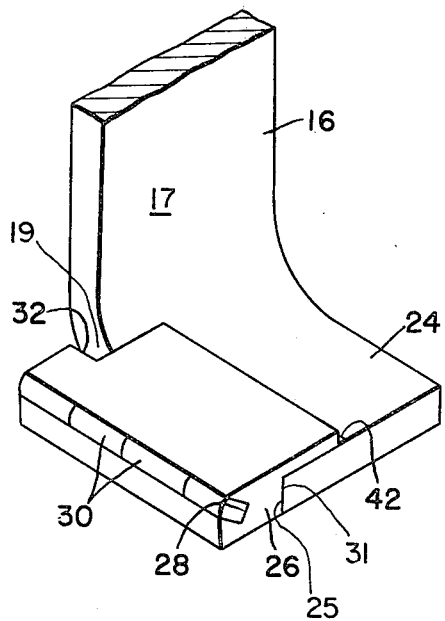
FIG. 2 is a fragmentary perspective view showing the outer end of an arm of the type that can be mounted on the rotor of FIG. 1 to form an earthworking tool member.

Referring first to FIG. 2, the support arm 16 illustrated therein has a laterally extending outer end portion 24 which may extend, for example, at right angles to the plane of the main portion 17 of the arm 16 and generally parallel to the axis of shaft 10. Outer end portion 24 supports a tool element 26 which is in the form of a block having a slot 28 formed therein along the forward side at the top. Mounted in the slot 28 are hard wear resistant elements 30 advantageously formed of hard metal carbide, such as cemented tungsten carbide and, preferably, brazed or soldered in place in slot 28.

The linearly extending block making up tool element 26 is notched at 31 to receive forwardly facing side 25 of end portion 24 of arm 16, and is also notched at 32 at one end so as to linearly extend over the forwardly facing side of the generally radial portion 17 of the respective support arm 16 and, in this manner, the forwardly facing side 19 of the support arm is protected against abrasion from the soil being worked. It has been found that the provision of the hard wear resistant material linearly extending into the plane of the generally radial shank portion 17 materially reduces the rate at which the forward side of the shank portion 17 will abrade away or "wash out" as the machine operates.

Figure 3:
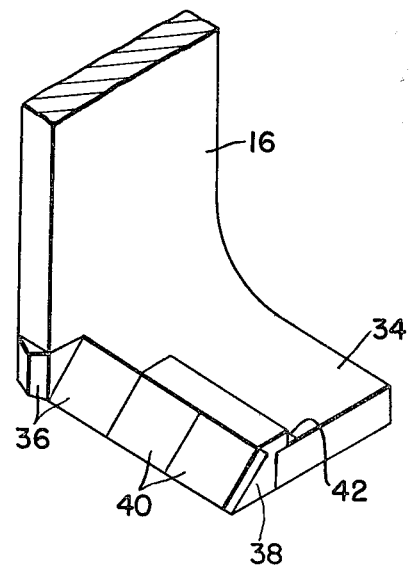
FIG. 3 is a view like FIG. 2 showing a modified arm.

In FIG. 3, the support arm illustrated has a laterally extending portion 34 at the outer end corresponding to lateral portion 24 in FIG. 2. However, the portion 34 itself is machined to receive hard wear resistant elements 36 while a relatively small tool element or block 38 is seated in a notch in portion 34 and supports further wear resistant elements 40. In the case of both of the modifications of FIGS. 2 and 3, the blocks 26 and 38 making up the tool elements are advantageously held in position as by welding 42.

FIG. 4 shows a modified arrangement wherein a support block 50 is provided which is fixed to the support plate 12 (FIG. 1) and which block has a socket 51 for receiving an end portion 52 of an arm 53 which extends outwardly from the machine rotor and terminates in a transversely slotted end portion 54 in which hard wear resistant inserts 56 are mounted. The arm 53 and the block 50 may be provided with aligned apertures through which a retaining pin 58 is inserted and bent over, as at 59, to hold the parts in assembled relation.

In FIG. 5, arm 16 corresponding to what is shown in FIGS. 1 to 3, has a laterally extending end portion 60 which has a socket 62 extending therethrough in the fore and aft direction adapted to receive a tongue element 64 extending rearwardly from a tool element or block 66 which, on the forwardly facing side 67, is provided with a surface for receiving insert elements 68 of hard wear resistant material which may, as mentioned, be brazed in place.

A feature of the FIG. 5 arrangement is that the forwardly facing side 67 of the tool element 66 has a forward cutting edge 21 preferably inclined about 10 degrees to a plane including the axis of the rotor (FIG. 1) so that the portion 13 of the tool element 66 disposed in front of the forwardly facing side 15 of the shank 17 leads the remainder of the forward side of the tool element. It has been found that this inclined forward edge 21 on the tool element 66 promotes penetration of the tool element into the earth and inhibits loading of the support arm to the extent that it will bend during operation of the machine.

FIG. 6 shows a tool element 70 similar to tool element 66 of FIG. 5 but in which the forwardly facing side of the tool element is provided with pointed insert elements 72 in transversely distributed relation while therebetween there are mounted the hard wear resistant planar elements 74 which, as in connection with the FIG. 5 arrangement, incline rearwardly from bottom to top.

FIG. 7 is a fragmentary view of tool element 70 drawn at enlarged scale and shows more in detail the manner in which the inserts 72 are configured, and also shows the placement and configuration of the hard wear resistant elements 74. As before, the wear resistant elements 56 in FIG. 4, 68 in FIG. 5 and 74 in FIGS. 6 and 7, are advantageously brazed in place on the respective support therefor.

FIG. 8 shows a tool element 80 with a forward earth engaging portion having laterally spaced, inclined planar elements 82 of hard wear resistant material which are brazed on surface regions provided therefor which incline rearwardly from bottom to top. Intermediate the elements 82 vertical surfaces 83 are provided on the forward side of element 80 and seated on these vertical surfaces 83 and brazed thereto are pentagonal or "log cabin" shaped inserts 84 of hard wear resistant material.

The arrangement of FIG. 8 provides for edges on the leading sides of elements 84 which will penetrate and break up the earth being worked while the inclined surfaces 82 will cause the earth to turn in a preferred direction.

FIG. 9 shows a support arm 16 with a laterally extending outer end portion 90 to which is attached a tool element or block 92 as, for example, by welding 94 with the forwardly facing side 95 of the tool element 92 having a slot 96 in which hard wear resistant elements 98 are fixed as by brazing.

The forwardly facing side 95 of the tool element 92 in FIG. 9 also advantageously inclines to the axial direction as in the case of the FIG. 5 modification and for the same purpose.

In every case, it will be understood that the hard wear resistant material is advantageously cemented hard metal carbide, such as cemented tungsten carbide, and that these elements are advantageously brazed or silver soldered in place, although the use of epoxy cement in certain instances is not foreclosed.

Each support arm 16 may be in the form of a strip of steel of uniform thickness from end to end, and this may be obtained from rolling and then cutting the rolled out strip to length and bending the strip to provide for the L-shaped configuration that is to be found in each arm. Heating treating and stress relieving then follow. Each support arm can also, as mentioned, be forged, thus permitting the support arm to be made to any desired thickness in any region thereof.

Referring to FIG. 5, testing of blades in the field have revealed that failures were occurring with a fracture along the juncture 15 between the shank portion 17 and the working end portion 60 of arm 16. In order to relieve this, it is best to have a foremost impact region 13 and a cutting or leading edge 21 that is inclined outwardly from impact region 13 and rearwardly from the direction of travel of the foremost impact region 13, as shown by the arrow.

It should be noted that it is the cutting or leading edge 21 that is inclined rearwardly from the direction of travel as it extends directly away from the impact region 13. The cutting edge 21 is to be distinguished from surfaces 68 which are inclined upwardly and rearwardly from the cutting edge 21.

As shown in FIG. 5, the tool element 64 may be attached by welding or other suitable means to the end portion 60. End portion 60 may or may not have a socket 62 when welding is utilized.

Referring to FIG. 10, there is shown an arm 100 which is formed into an L-shaped member having a shank portion 102 and a laterally extending working end portion 104. Shank portion 102 is adapted (hole 124) to be supported on a rotary member 14 (see FIG. 1) so that the shank portion 102 extends generally radially outwardly from the rotary member 14 and shaft 10 and appears as an L-shaped member when viewed along a line perpendicular to the axis of rotation of the rotary member 14. End portion 104 has a forward working portion 106 which is comprised of a metal block 108 having a foremost impact point 110 and sharp leading edges 112 which incline rearwardly away from the impact point 110 as they extend outwardly to each side of block 108.

Abrasion protection means or elements 114 are disposed in an abrasion protective manner on the forwardly facing side 115 of metal block 108 and are inclined upwardly and rearwardly as they extend radially inwardly and axially outwardly from the impact point 110. Metal block 108 is usually made from a material that is harder and tougher than the metal making up arm 100. The abrasion protection means 114 are comprised of a hard cemented metal carbide material and are brazed to the front side 115 of the metal block 108. End portion 104 has trailing side 117 and top and bottom sides 119, 121 (FIG. 11). Metal block 108 has a rearwardly extending portion 116 that can be fastened to top side 119 of end portion 104 by welding or any other suitable means.

Referring now to FIG. 11, there is shown abrasion protection means 114 mounted on the working end 106 of arm 100. It should be noted that the arm 100 has a certain thickness and has a side wall 118 that is located on the opposite side from the working portion 106. It is to be noted that the abrasion protection means 114 are linearly extending in front of the working portion 106 and forward of the lowermost part of the radial portion of shank 102.

Notch 120 provides some clearance immediately above the abrasion protection means that forms the leading or cutting edge 112. The abrasion protection means 114 extends laterally across the thickness of the working portion 106 until means 114' almost touches an imaginary line 118' that could be drawn vertically to extend the side wall 118 downwardly.

Figure 12:
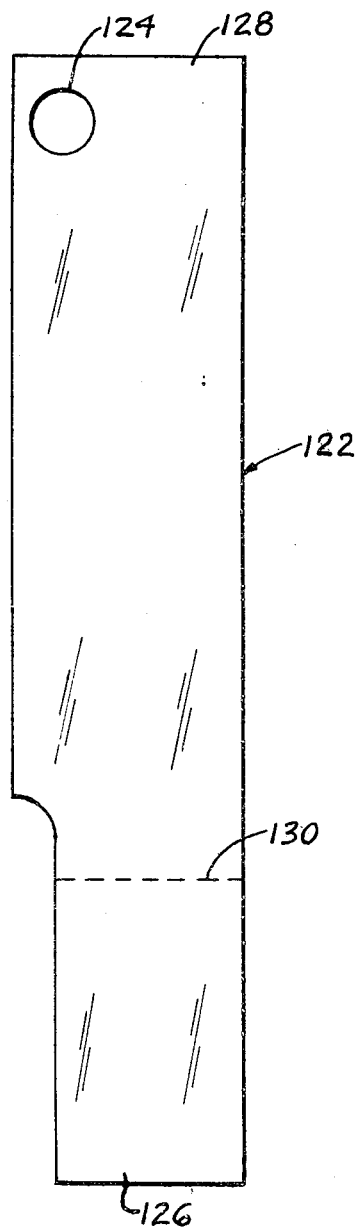
FIG. 12 is a plan view of a strip of steel used in the manufacture of the preferred embodiment of FIG. 10.

Shown in FIG. 12 is a flat strip of steel 122 that is used in the manufacture of the preferred embodiment shown in FIG. 10. The strip of steel 122 is first formed to be rectangular in nature and then is blanked so as to have a hole 124 at one end 128 and a recessed end 126. The recessed end 126 is narrower than end 128 of the metal bar 122. The metal bar 122 will then be bent somewhere beyond the beginning of the recess such as at dotted line 130 shown in FIG. 12.

Figure 13:
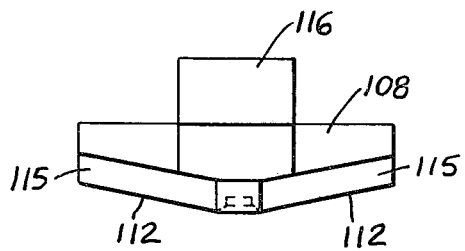
FIG. 13 is a plan view of a piece that can be releasably attached or welded to the L-shaped bar element shown in FIG. 10.

FIG. 13 shows the metal block 108. Metal block 108 has a rearwardly extending portion 116 defining notch 117 (FIG. 15) that is used to attach the block 108 to the forward working portion 106 of L-shaped metal bar 100.

Figure 14:
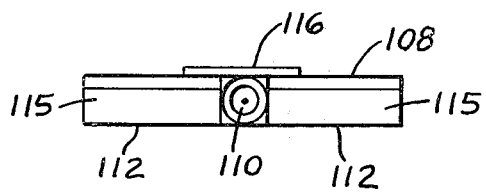
FIG. 14 is a front view of the element shown in FIG. 13.

FIG. 14 is a front view of the forward impact point 110 and the cutting edges 112 that are on metal block 108.

Figure 15:
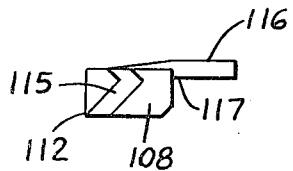
FIG. 15 is a side view of the element shown in FIG. 13.

FIG. 15 is a side view of the rearwardly extending portion 116 and the forward cutting edges 112 of the metal block 108.

Modifications may be made within the scope of the appended claims.

What is claimed is:

1. An earthworking tool comprising; an arm, said arm having a shank portion, said shank portion adapted to be supported on a rotary member having an axis of rotation, one end of said shank portion of the arm extending generally radially outwardly from the member, said one end of said shank portion joining a working end portion of said arm extending laterally to one side of said shank portion in a direction substantially parallel to said axis of rotation so as to provide said arm with an L-shaped configuration when viewed along a line perpendicular to said axis of rotation, said shank portion and said working end portion having a forwardly facing side and a trailing side with respect to a given direction of rotation of said arm, abrasion protective means mounted on said working end of said arm and disposed in linerly extending relation to said forwardly facing side thereof and to a portion of said forward face of the radial portion of said shank portion.

2. An earthworking tool according to claim 1 in which said forwardly facing side of said working end portion of said arm is inclined at an angle of about 10 degrees to a plane containing the axis of rotation of said arm.

3. An earthworking tool comprising; an arm, said arm having a shank portion, said shank portion adapted to be supported on a rotary member having an axis of rotation, one end of said shank portion of the arm extending generally radially outwardly from the member, said one end of said shank portion joining a working end portion of said arm extending laterally to one side of said shank portion in a direction substantially parallel to said axis of rotation so as to provide said arm with an L-shaped configuration when viewed along a line perpendicular to said axis of rotation, said shank portion and said working end portion having a forwardly facing side and a trailing side with respect to a given direction of rotation of said arm, means mounted on said working end of said arm end disposed in abrasion protective relation to said forwardly facing side thereof and a portion of said forward face of said shank portion, said means comprises a block mounted on said working end portion of said arm, said block having a forward side, at least one element of hard wear resistant material carried on said forward side of said block, and wherein said working end of said arm is wider in one direction than in the other direction.

4. An earthworking tool according to claim 3 in which said forward side of said block has a sharp edge.

5. An earthworking tool according to claim 3 which includes a plurality of said hard wear resistant elements and including at least one element presenting an edge extending in the forward direction and at least one element presenting a point extending in the forward direction.

6. An earthworking tool according to claim 5 in which said elements with points thereon protrude forwardly beyond the others of said elements.

7. An earthworking tool according to claim 3 which includes a plurality of said hard wear resistant elements, said forward side of said block being inclined relative to the direction of movement thereof.

8. An earthworking tool according to claim 7 in which the angle of inclination of the forward side of said block is about 10 degrees to the axis about which said arm rotates.

9. An earthworking tool according to claim 3 in which said block is welded to said working end portion of said arm.

10. An earthworking tool according to claim 3 further comprising said working end portion having a socket in said forwardly facing side, and said block having a tongue element receivable in said socket.

11. An earthworking tool according to claim 10 in which said block has rearwardly facing shoulder means engageable with said working end portion of said arm to sustain working loads imposed on said block.

12. An earthworking tool comprising; an arm, said arm having a shank portion, said shank portion adapted to be supported on a rotary member having an axis of rotation, one end of said shank portion of the arm extending generally radially outwardly from the member, said one end of said shank portion joining a working end portion of said arm extending laterally to one side of said shank portion in a direction substantially parallel to said axis of rotation so as to provide said arm with an L-shaped configuration when viewed along a line perpendicular to said axis of rotation, said shank portion and said working end portion having a forwardly facing side and a trailing side with respect to a given direction of rotation of said arm, means mounted on said working end of said arm and disposed in abrasion protective relation to said forwardly facing side thereof and a portion of said forward face of said shank portion, said means having a forwardly facing side having a foremost impact region and an adjoining cutting edge inclining laterally outwardly from said impact region and rearwardly with respect to the direction of rotation of said impact region, said means comprising surfaces of hard wear resistant material that are inclined rearwardly with respect to said cutting edge, said working end portion of said arm having a certain thickness when viewed in front view, said means extending substantially across and in front of the thickness of said working end portion, and wherein said forwardly facing side of said one end of said shank portion having a notch at the juncture of said one end portion with said working end portion.

13. An earthworking tool comprising; an arm, said arm having a shank portion, said shank portion adapted to be supported on a rotary member having an axis of rotation, one end of said shank portion of the arm extending generally radially outwardly from the member, said one end of said shank portion joining a working end portion of said arm extending laterally to one side of said shank portion in a direction substantially parallel to said axis of rotation so as to provide said arm with an L-shaped configuration when viewed along a line perpendicular to said axis of rotation, said shank portion and said working end portion having a forwardly facing side and a trailing side with respect to a given direction of rotation of said arm, means mounted on said working end of said arm and disposed in abrasion protective relation to said forwardly facing side thereof and a portion of said forward face of said shank portion, said means having a forwardly facing side having a foremost impact region and an adjoining cutting edge inclined laterally outwardly from said impact region and rearwardly with respect to the direction of rotation of said impact region, said working end portion of said arm having a certain thickness when viewed in front view, said abrasion protection means extending substantially across and in front of the thickness of said working end portion, and said one end portion of said arm having a notch in said forward face at the juncture of said one end portion with said working end portion.

14. An earthworking tool comprising; an arm, said arm having a shank portion, said shank portion adapted to be supported on a rotary member having an axis of rotation, one end of said shank portion of the arm extending generally radially outwardly from the member, said one end of said shank portion joining a working end portion of said arm extending laterally to one side of said shank portion in a direction substantially parallel to said axis of rotation so as to provide said arm with an L-shaped configuration when viewed along a line perpendicular to said axis of rotation, said shank portion and said working end portion having a forwardly facing side and a trailing side with respect to a given direction of rotation of said arm, means mounted on said working end of said arm and disposed in abrasion protective relation to said forwardly facing side thereof and a portion of said forward face of said shank portion, said portion of said forward face of said shank portion comprising a notch located at the juncture of said shank portion with said working end portion.

15. An earthworking tool according to claim 14 wherein said means having a forwardly facing side having a foremost impact region and an adjoining cutting edge inclining laterally outwardly from said impact region and rearwardly with respect to the direction of rotation of said impact region.

16. An earthworking tool according to claim 14 in which said means comprises surfaces of hard wear resistant material that are inclined rearwardly with respect to said cutting edge.

17. An earthworking tool according to claim 14 in which said working end portion of said arm has a certain thickness when viewed in front view, said abrasion protection means extending substantially across and in front of the thickness of said working end portion.

* * * * *